United States Patent [19]

Chevillat et al.

[11] Patent Number: 5,058,134
[45] Date of Patent: Oct. 15, 1991

[54] PROCESS OF SYNCHRONIZING A RECEIVING MODEM AFTER A TRAINING ON DATA

[75] Inventors: Pierre R. Chevillat, Kilchberg; Evangelos Eleftheriou, Zurich; Dietrich G. U. Maidwald, W&ae.Denswil, all of Switzerland; Michel Quintin, La Gaude, France

[73] Assignee: International Business Machines Corp., Armonk, N.Y.

[21] Appl. No.: 397,949

[22] Filed: Aug. 24, 1989

[30] Foreign Application Priority Data

Jul. 12, 1989 [FR] France ............................. 89 480107

[51] Int. Cl.[5] .......................... H03C 5/00; H03D 5/00
[52] U.S. Cl. ...................................... 375/39; 375/42; 375/106; 375/119; 379/97
[58] Field of Search ................. 375/8, 9, 41, 48, 106, 375/39, 110, 118, 119, 58, 93, 97, 98; 329/304, 349, 350, 351; 332/103, 145, 150, 155, 159–162; 455/60; 379/93, 97, 98

[56] References Cited

U.S. PATENT DOCUMENTS

| | | | |
|---|---|---|---|
| 4,679,227 | 7/1987 | Hughes-Hartegs | 375/39 X |
| 4,777,640 | 10/1988 | Turner et al. | 375/118 |
| 4,894,844 | 1/1990 | Forney, Jr. | 375/42 |
| 4,943,980 | 5/1989 | Dobson et al. | 375/42 |

FOREIGN PATENT DOCUMENTS 0238822 9/1987 European Pat. Off. .

OTHER PUBLICATIONS

Electronics, vol. 39, No. 22, 31st Oct. 1966, pp. 91–94; M. Poppe: "Double Phase-Shift Keying Speeds Data Over Voice Channels", p. 91, Column 2, Paragraph 3, p. 92, Column 1, Paragraph 2, figure at foot of p. 92.
Patent Abstracts of Japan, vol. 12, No. 291 (E–644), 9th Aug. 1988; & JP-A-63 067 851 (Fujitsu) Abstract.

Primary Examiner—Benedict V. Safourek
Assistant Examiner—Tesfaldet Bocure
Attorney, Agent, or Firm—Edward H. Duffield

[57] ABSTRACT

In data transmission wherein a transmitting modem transmits data signals to a receiving modem via a telephone line, the process of rotating, in the transmitting modem, the phase of the point of the constellation resulting from a group of data bits by a predetermined phase value, and then rotating, after a predetermined delay in the receiving modem, the phase of the estimated point resulting from the transformation of the analog signal by the opposite of said predetermined phase value, and calculating the mean-squared error between the rotated point and the estimated point of the constellation the error being used to determine whether the receiving modem is out of synchronization.

2 Claims, 4 Drawing Sheets

PROCESS OF SYNCHRONIZING A RECEIVING MODEM AFTER A TRAINING ON DATA

Field of Invention

The present invention relates generally to data transmission systems wherein a transmitting modem transmits data signals to a receiving modem via a telephone line, more particularly, it relates to a process of synchronizing the receiving modem with respect to the transmitting modem after a training on data.

Prior Art

In the transmission of data between a first data terminal equipment (DTE) and a second DTE over telephone lines, each DTE is equipped with a modem. In modems, the carrier signal is modulated by the data in a modulator at the sending end and demodulated in a demodulator at the receiving end. Where the transmission takes place between a plurality of local DTEs and a plurality of remote DTEs, a multiplexer enables a single modem to be connected to the plurality of DTEs that receive or transmit data on a time-multiplex basis. That is, each data byte sent to or received from the local DTE is formed by juxtaposing groups of bits received from or sent to each remote DTE, with the number of bits in each group being dependent on the transmission speed assigned to the corresponding DTE.

The data bit stream received at the input of the modem is loaded in a serializer/deserializer which provides parallel groups of bits, the number of bits in each group depending on the data bit rate of the modem. Each group is converted to a point in a phase-amplitude diagram, all the points of the diagram forming a constellation. Each point is then translated into a pair of coordinate values corresponding to the coordinates of the point. The technique for coding the points of the constellation is described in the article entitled "Multidimensional Signal Constellations for Voice-band Data Transmission" by A. Gersho and V. Lawrence, published in IEEE Journal of Selected Area in Communications, vol. SAC-2, No. 5, 1984.

Then, these two signal values, called quadrature signal values, are modulated by a carrier signal before being spectrally shaped in a filter centered at the carrier frequency. This provides as an output a number of samples of the shaped signal each baud time and complying with the sampling theorem. At last, the samples are provided to the digital-to-analog converter in order to be converted into an analog signal to be sent over the telephone line.

Reciprocally, in the other direction, the analog signal received from the telephone line is first converted into digital samples. The samples are filtered and the output of the filter, representing two in-phase and quadrature components, is used to provide a point in the plane corresponding to a group of bits. The juxtaposed groups of bits are then serially transmitted to the DTE or distributed to the different DTEs in case of multiplexing.

When a transmission of data is initiated from a local modem to a remote modem, a training sequence is sent to adjust the gain control, the equalizer coefficients and all similar coefficients of the remote modem. It is no problem for the remote modem to identify the beginning of the data message which follows the training sequence since the end of the training sequence is recognized by the remote modem receiver. But, in some cases, the remote modem receiver has to adjust itself on the data received from the local modem. This happens in a multipoint configuration where one remote tributary modem which has been disconnected from the network has to be connected again.

In such a case, the training of this tributary modem is made by using data, well-known as "training on data"; this has the difficulty of recognizing the beginning of the data message.

In some cases, the difficulty in the receiving modem for synchronizing in case of "training on data", is not detrimental since only some data bits are lost and it is sufficient to retry the data transmission after the synchronization has been made.

But there are modem configurations wherein the loss of synchronization after a "training of data" is very detrimental. Thus, due to the compliance with the CCITT recommendations, the present day modems use a modulation rate of 2400 bauds, resulting in data bit rates which are multiples of 2400 such as 2400, 4800, 9600, 14400 bps (bits/sec). However, with a high data bit rate such as 19, 200 bps, keeping a modulation rate of 2400 bauds leads to a constellation which is too complex to be easily processed. The solution would be to increase the bandwidth. Unfortunately, the available telephone line bandwidth is limited to about 3000 Hz, which means that only a bandwidth of a maximum of about 2900 Hz is possible if a good performance transmission without line distortions is required. Therefore, and in order to have a higher integration, the solution which has been described in European patent application 89480004.4 has been to keep the same external hardware and to modify the signal processor software in order to increase the modulation rate. In such a modem, the signal received from the line is processed in such a way that the signal processor provides groups of 7 bits at a modulation rate of 2743 bauds. 8 groups of 7 bits are then converted into 7 words of 8 bits which are serialized in order to be transmitted to the DTE in the form of a serial stream at 19,200 bits/s. Such an adapted modem behaves as a modem operating at a modulation rate of 2743 bauds on a periodic process interval of 8/2743 sec. corresponding to a block of 56 bits which is transmitted to the DTE.

Assuming now that the above modem be connected, not to a single DTE, but to several DTEs (the so-called multiplex configuration), a loss of synchronization in data results in an important drawback. As a matter of fact, multiplexing data between several DTEs means that, each baud time, some bits are sent to a first DTE, some other bits are sent to a second DTE, and so on. If a loss of synchronization happens, which means that the determination of the beginning of a baud time is erroneous, the bits are not dispatched correctly, and the bits received by each DTE are erroneous.

OBJECTS OF INVENTION

It is therefore the object of the invention to provide an improved solution for enabling the frame synchronization of the receiving modem to be achieved after a "training on data".

BRIEF SUMMARY OF INVENTION

This solution is provided by a process implemented in a data transmission modem wherein a transmitting modem transmits data signals to a receiving modem via a telephone line. The transmitting modem is of the type wherein, at each baud time, a group of bits is translated into a point in a constellation of points defined by an amplitude and a phase. This is done before the point is transformed into analog signals transmitted over the telephone line. The receiving modem is of the type wherein each received point resulting from the transformation of analog signals received from the telephone line is estimated as being a point of the constellation before being translated into a group of bits.

The process according to the invention consists in rotating, in the transmitting modem, the phase of the point of the constellation by a predetermined phase value, and then, in the receiving modem, rotating, after a predetermined delay, the phase of the point resulting from the transformation of analog signals by the opposite of the predetermined phase value, and computing the error between the rotated point and the estimated point of the constellation, and then modifying, in response to the error, the predetermined phase value so that the subsequent error may be reduced to a minimum compatible with the modem operation.

An improved synchronization system is also implemented in the above-mentioned data transmission system, comprising enphasing means in the transmitting modem for adding, at each baud time, a predetermined phase value taken amongst a sequence of phase values, to the phase of the point of the constellation, and dephasing means in the receiving modem for subtracting, at each baud time, the predetermined phase value from the phase of the point provided after transformation of the receiving analog signals, and error means for determining the mean-square error between the point obtained after the predetermined phase value has been subtracted and the estimated point of the constellation, and control means responsive to the mean-square error for advancing or delaying the sequence of phase values in order to reduce the error to a minimum compatible with the modem operation.

BRIEF DESCRIPTION OF DRAWING

The foregoing and other objects will be more fully understood from the following description in reference to the drawings wherein.

DESCRIPTION OF PREFERRED EMBODIMENT

Figure 1:
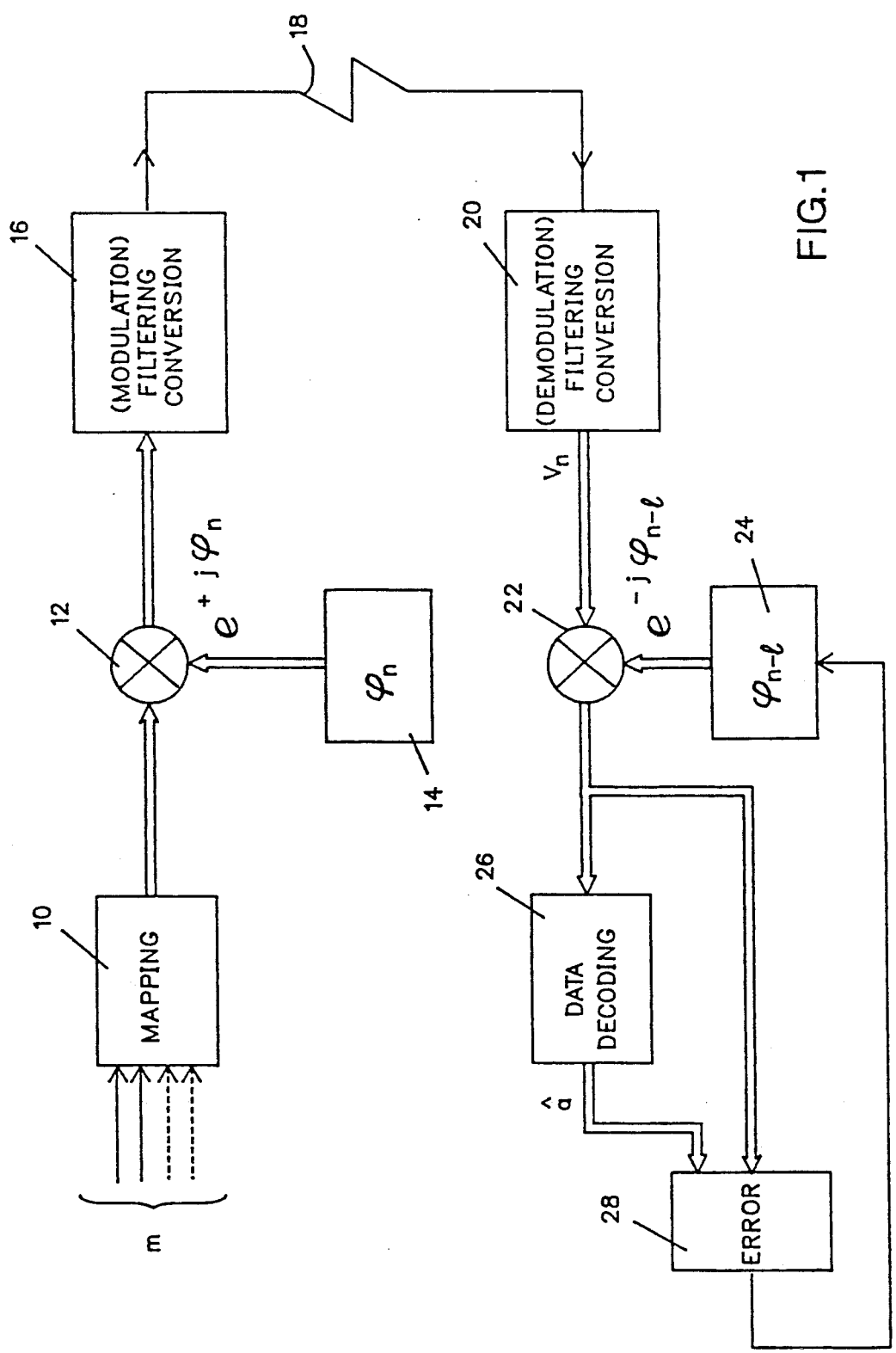
FIG. 1 depicts a flow diagram showing a data transmission system incorporating the invention.

FIG. 1 shows a data transmission system wherein a group of m bits is translated, at each baud time, by mapping device 10 into a point of a constellation defined in the complex plane by an amplitude and a phase. The two coordinates of the point define a complex signal (it must be noted that complex signals are represented in FIG. 1 by a double line whereas real signals are represented by a single line) which is multiplied, in multiplier 12 by the complex value $e^{j\phi_n - e}$ (which is equivalent to a phase rotation).

$\phi_n$ is a phase value of a predetermined sequence provided by phase sequence block 14. Then, the rotated signal is processed by modulation, filtering and conversion block 16 before being transmitted over telephone line 18 to the receiving modem. It should be noted that in block 16, the word "modulation" is between brackets since the invention can be incorporated also in baseband modems which do not use any modulation. The same is true in block 20 for "demodulation".

At the receiving modem, the analog signal is processed by demodulation, filtering and conversion block 20. It results from this processing at each baud time that a point of the complex plane is defined by an amplitude and a phase. The resulting complex signal $V_n$ is multiplied, in multiplier 22, by the complex $e^{-j\phi_n - e}$ (which is also equivalent to a phase rotation). $\phi_{n-e}$ is a phase value of the same predetermined sequence as for the transmitting modem, which is provided by sequence block 24. But, at baud time n, the signal $V_n$ which is processed corresponds, in fact, to the symbol which has been processed in the transmitting modem at baud time $n-1$, where l is a time delay induced by the transmitting modem processing, the telephone line and the receiving modem processing.

The phase rotated signal issued from multiplier 22 is then decoded in data decoding device 26 which determines the point of the constellation which is estimated to correspond to the point of the constellation which has been originally transmitted. The estimate â and the phase rotated signal are used as inputs in the error circuit 28 which computes the mean-square error in order to minimize the expression $$\sum_{}^{n} |V_n e^{-j\phi_n} - \rho - a|^2.$$

over a number of baud times.

If the value found from the above expression is sufficiently important, proving that the receiving modem is out of synchronization because the time delay has changed, the phase sequence provided by sequence block 24 is advanced (or delayed) in order to subsequently minimize the error (there is a minimum error due to noise). It should be noted that, in addition, correct equalizer updating requires multiplication of the decision error by $e^{+j\phi_n - e}$ before applying it in the update algorithm.

Ideally, the phase sequence should be designed such that signal decoding is incorrect in all other shift positions of the sequence. This generates a large mean-squared error whenever the transmitting modem sequence and the receiving modem sequence are not synchronized.

The choice of the phase sequence depends upon the constellation which is used. Indeed, by definition the error is zero if the constellation is correctly positioned i.e. for phase=0°. But the error is also zero for a phase rotation wherein the constellation is correctly positioned, that is when the constellation presents a rotational symmetry. Therefore, the constellation-dependent properties have to be taken into account when designing a phase sequence which maximizes error accumulation during loss of synchronization.

Figure 2A:
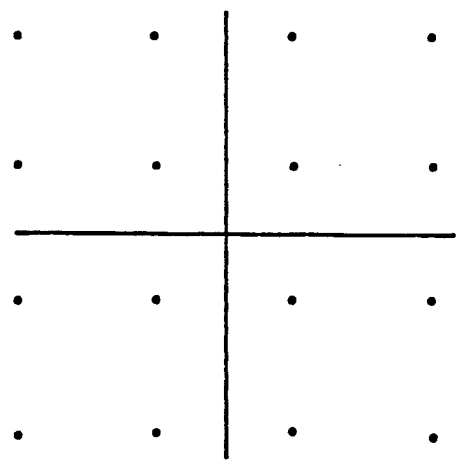
FIG. 2a shows a graphic of a 16-point constellation.
Figure 2B:
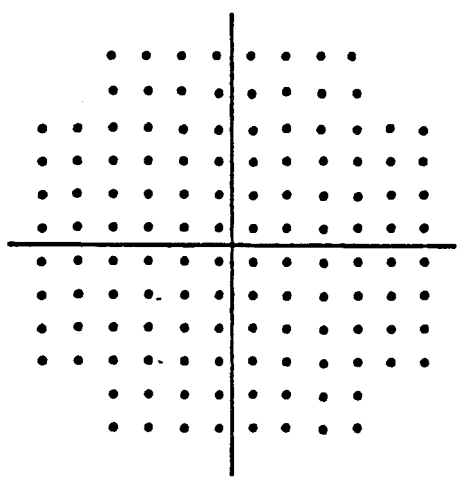
FIG. 2b shows a graphic of a 128-point constellation.

In fact, there exist two types of constellations, the first constellations having a rotational symmetry of 90° (and the multiple 180°, 270°) such as the 16-point constellation shown on FIG. 2a, or the 128-point constellation shown on FIG. 2b. With modems using such constellations, the phase sequence must be chosen so that there is no possibility of dephasing the signal of 90°, 180° or 270° in case of loss of synchronization by the receiving modems. In other words, the difference between a phase value of the sequence and any other value of the same sequence, should not be 90°, 180°, 270° or 360°.

Figure 2C:
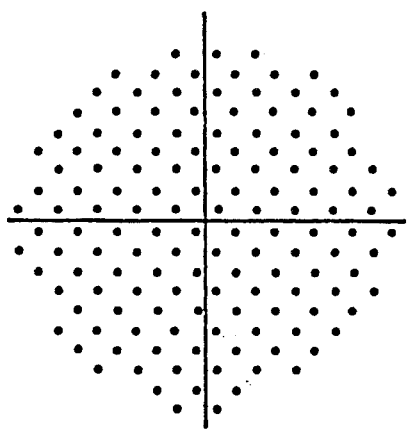
FIG. 2c shows a graphic of a 144-point constellation.
Figure 2D:
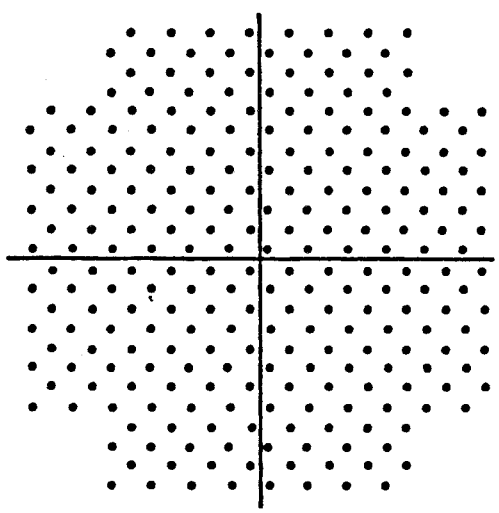
FIG. 2d shows a graphic of a 256-point constellation.

Another category of constellations are those having only a rotational symmetry of 180°, such as the 144-point constellation shown on FIG. 2c or the 256-point constellation shown on FIG. 2d. With modems using such constellations, the phase sequence should be chosen such that the difference between a phase value of the sequence and any other phase value of the same sequence is never 180° or 360°.

For sake of example of the implementation of the invention, modems operating at a speed of 19 200 bits/s are now considered. Such modems operate according to the trellis-coded modulation (TCM) technique with a modulation rate of 2743 bauds, and use a constellation of 256 points as shown on FIG. 2d. It must be noted that the same constellation could be used in modems operating at a speed of 19 200 bits/s, but which do not operate in TCM, and with a modulation rate of 2400 bauds.

Figure 3:
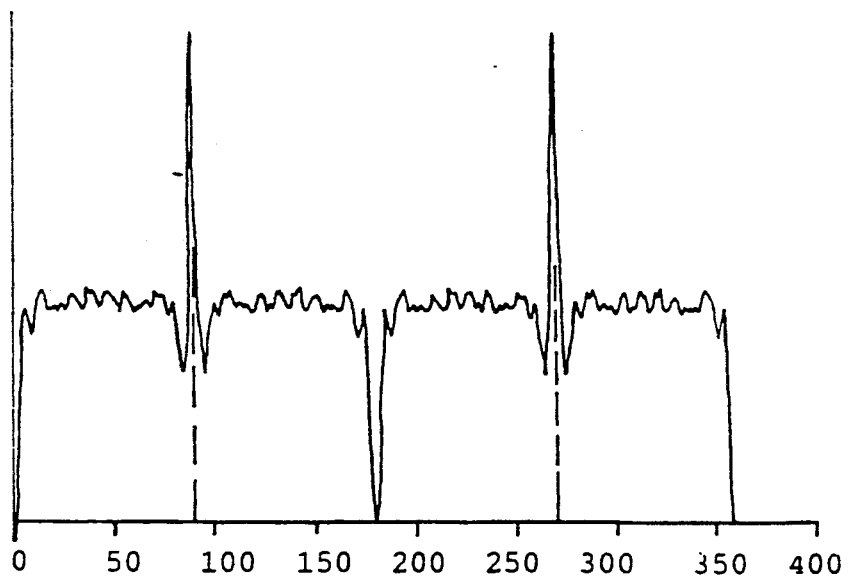
FIG. 3 is a diagram representing the mean-square error in function of the phase-rotation of the 256-point constellation.

FIG. 3 represents the mean-square error of a receiving modem which is applicable to the 256-point constellation of FIG. 2d, with a phase offset relative to an incoming stream of data signals. As shown, the error is zero if the constellation is correctly positioned for 0° or 360°, but is also zero for 180°. Conversely, the error is maximum for 90° and 270°.

In the above example, a cyclic phase sequence of $k=8$ values ($\phi_{n+k}=100n$) asssociated with the multiples of 45° may been selected. The order of the sequence to be applied can be checked by tabulating an $8\times 8$ matrix with the phase sequence in the first row and the seven sequences created by all single circular shifts in the remaining rows. By inspecting each column, the angle differences with respect to the top value yielding 0° and 180°, or 90° and 270° are marked. For a good phase sequence, 0° and 180° should not appear in any row of the shifted sequences, or in case they occur, their minimal error contributions must be compensated within the same row by an equal number of 90° or 270° difference. Thus, the sequence :

$$\phi n=\{0°, 135°, 225°, 90°, 270°, 45°, 315°, 180°\}$$

was found to meet the above criteria.

Another cyclic phase sequence with favorable error-accumulation properties is derived from 36-phase modulation, where all phase values are multiples of 10.

But other phase sequences with k being either less than 8 or more than 8, and a phase unit other than 45° or 10° can be used. Thus, a cyclic sequence of 9 phase values, derived from a 20-phase scheme (all value are multiples of 18°) can be considered.

Though all the above examples consider cyclic phase sequences, it must be noted that the invention is not limited to cyclic sequences. Cyclic sequences are only easier to implement than non-cyclic sequences.

In summary, the invention can be implemented in all data transmission systems using modems of the type wherein, at each baud time, a group of bits is translated into a point of a constellation in the transmitting modem, and a reciprocal transformation is conducted in the receiving modem. But, the invention is more particularly applicable to systems using modem configurations wherein the loss of synchronization after a "training on data" is detrimental. This is the case when the modem is software-adapted for operating at a modulation rate different from the basic rate of the environment, and especially if the data received by the receiving modem have to be multiplexed between several DTEs.

Though the invention has been described in reference to preferred embodiments, it is within the skill of a man ordinarily skilled in the art to make changes in details by using the teachings of the description and without departing the scope of the invention.

We claim:

1. In a data transmission system wherein a transmitting modem transmits data signals to a receiving modem via a telephone line, said transmitting modem being of the type wherein, at each baud time, a group of bits is translated into a point of a constellation defined by an amplitude and a phase before said point is transformed into analog signals transmitted over said telephone line, said receiving modem being of the type wherein, at each baud time, each point resulting from the transformation of analog signals received from said telephone line is estimated as being a point of the constellation before being translated into a group of bits, a process of synchronizing said receiving modem with respect to said transmitting modem whenever training on data, characterized by the following steps:

in said transmitting modem, rotating the phase of said point of said constellation by a predetermined phase value supplied by a predetermined sequence of phase values;

in said receiving modem, transforming receiving analog signals into a point of a constellation defined by an amplitude and a phase, and;

rotating, after a predetermined delay, said phase of said point resulting from said transformation of analog signals, by the opposite of said phase value of said predetermined sequence of phase values used in said transmitting modem; and computing the phase difference error between said rotated point and the point of the constellation estimated after transformation of said analog signals received from said telephone line; and replacing, in response to said phase difference error, said predetermined phase value by another phase value of said predetermined sequence so that the subsequent phase difference error is reduced to a minimum compatible with the modem operation.

2. in a data transmission system wherein a transmitting modem transmits data signals to a receiving modem via a telephone line, said transmitting modem including mapping means for transforming at each baud time a group of data bits into a point of a constellation defined by an amplitude and a phase in the complex plane, and analog transforming means for transforming the coordinates of said point to analog signals to be transmitted over said telephone line, said receiving modem including digital transforming means or transforming the analog signals from the telephone line into a point defined by an amplitude and a phase in the complex plane, and decoding means for determining an estimated point in said constellation corresponding to the point provided by said digital transforming means, a synchronization system characterized in that it comprises:

enphasing means in said transmitting modem, for adding, at said each baud time, a predetermined phase value supplied by a predetermined sequence of phase values, to the phase of said point of a constellation as provided by said mapping means;

dephasing means in said receiving modem for subtracting, at said each baud time, said predetermined phase value supplied by a predetermined sequence of phase values from said phase of said point provided by said digital transforming means;

error calculation means for determining the mean-squared difference error between said point resulting from said dephasing predetermined, and said estimated point of said constellation; and control means responsive to said mean-squared error, said control means being connected to said dephasing means values to reduce subsequent said errors to a minimum compatible with the modem operation, thereby synchronizing the data received by said receiving modem with respect to the data transmitted by said transmitting modem.

* * * * *